United States Patent [19]

Newton

[11] Patent Number: 4,569,619
[45] Date of Patent: Feb. 11, 1986

[54] MACHINE TOOL CUTTER

[75] Inventor: Douglas Newton, St. Clair Beach, Canada

[73] Assignee: J. P. Tool Limited, Windsor, Canada

[21] Appl. No.: 538,444

[22] Filed: Oct. 3, 1983

[30] Foreign Application Priority Data

Feb. 14, 1983 [CA] Canada .................................. 421559

[51] Int. Cl.[4] .............................................. B26D 1/00
[52] U.S. Cl. ........................................ 407/15; 407/114
[58] Field of Search ................................... 407/15, 114

[56] References Cited

U.S. PATENT DOCUMENTS

| 1,359,831 | 11/1920 | Oakley | 407/15 |
| 2,487,757 | 11/1949 | Iversen | 407/13 |
| 3,656,220 | 4/1972 | Dupuis | 407/15 |
| 3,670,380 | 6/1972 | Moore et al. | 407/42 |
| 3,875,663 | 4/1975 | Gustafson et al. | 407/114 |
| 3,914,840 | 10/1975 | Ferree et al. | 407/15 |
| 4,259,033 | 3/1981 | McCreery et al. | 407/114 |
| 4,277,207 | 7/1981 | Proulx | 407/15 |

FOREIGN PATENT DOCUMENTS 2916809  11/1979  Fed. Rep. of Germany ........ 407/15

Primary Examiner—Leonidas Vlachos
Attorney, Agent, or Firm—Neuman, Williams, Anderson & Olson

[57] ABSTRACT

A metal cutting tool is described having an elongated tool body with an elongated, preferably arcuate, tool face portion. A plurality of recesses are formed in the tool face, each having a flat bottom face inclined inwardly and rearwardly to the longitudinal axis of the tool body. Each recess contains an indexable small, square, thin cutter insert with a bottom face resting on the flat bottom of the recess. Each insert has a flat bottom face, while the top face has a shallow generally spherical convex contour. Each side face is generally concave and forms an arcuate cutting edge with the convex top face. Each side face forms an acute angle with the top face of the insert, and the magnitude of this acute angle and the degree of inclination of the recess flat bottom face are such as to provide a positive rake angle of 1°-30° between the cutter portion and the work cut.

21 Claims, 6 Drawing Figures

MACHINE TOOL CUTTER

BACKGROUND OF THE INVENTION

1. Field of the Invention

This invention relates to a novel machine tool cutter and particularly to a broaching tool in which the cutting surfaces are at a positive rake angle to the work cut.

2. Description of the Prior Art

The typical broaching tool is in the form of an elongated body having a plurality of spaced annular ribs generally transverse to the longitudinal axis of the body, these ribs forming a series of annular cutters. Each annular cutter has a cutting edge and adjacent chip relief groove and normally engages the work cut on the work piece at a positive rake angle.

The usual designs have placed tremendous stresses on the tool and the cutters as well as on the work piece being broached. There have been various attempts in the past to develop new designs which will decrease the load on individual cutters, such as the tooth design shown in U.S. Pat. No. 3,849,852, issued Nov. 26, 1974. That design in theory decreases the load because the individual tooth takes a narrow deep cut rather than a wide shallow cut.

U.S. Pat. No. 1,945,535, issued Feb. 6, 1934, describes a broaching tool having cutters with a positive rake angle and a specially designed chip relief groove. The cutter at a positive rake angle will in theory take a cleaner cut and leave a smoother surface behind the cut by rolling the chip formed into the chip relief groove, thereby reducing fracturing off of small particles and serving to reduce generation of heat in the work and in the tool.

As a tool cutter is forced through a work piece, high friction is generated between the tool face and the compressed material adjacent the tool face. With the high temperature and high specific pressure present, a layer of material clings to the tool face to form what is known as a built-up edge. This built-up edge is, therefore, forced through the work by the cutter face and does the actual fracturing or cutting. The chip body shears away from this built-up edge and passes off above.

As the built-up edge becomes larger and larger, it becomes more and more unstable until fragments thereof are torn off. The built-up edge is, therefore, continually varying in size and attacking the area of fracture or shear with a varying area which causes roughness. Furthermore, as the built-up edge increases in size, the chip being formed and following upwardly of the tool face is subjected to a band of increasing curvature which would remain at a substantially constant value if the built-up edge can be kept at a reduced size.

Such problems were recognized by the inventors in U.S. Pat. No. 2,392,481, issued Jan. 18, 1946, but they continued to work on the size and shape of the chip relief grooves much in the manner as was done by the inventor in U.S. Pat. No. 1,945,535.

None of these prior designs was able to solve the problem of the immense pressures and built-up edge which caused the cutting edge to quickly wear and frequently break with the resultant rough work piece surface behind the cut.

In Proulx et al U.S. Pat. No. 3,946,472, issued Mar. 30, 1976, there is described a broaching tool in which the cutter teeth are in the shape of buttons or discs. This had the unique feature of being able to make use of the angular position of the discs so as to form a smoothly curving contoured surface. This represented a very significant advance in the art in being able to greatly reduce the power required per unit volume of chip removed. The result was less wear on the individual cutters, less breakage of cutters and less damage to the work piece being machined.

It is, therefore the object of the present invention to provide an improved configuration of tool cutter which can take advantage of the benefits of U.S. Pat. No. 3,946,472 while providing a positive rake angle between the cutter face and the work cut.

SUMMARY OF THE INVENTION

In accordance with the present invention there is provided a novel metal cutting tool comprising an elongated tool body having an elongated tool face portion. A plurality of recesses or pockets are formed in the tool face, each having a flat bottom face inclined inwardly and rearwardly to the longitudinal axis of the tool body. Cutting inserts in the form of small, generally square, thin cutter wafers are mounted in the recesses with a bottom face of each insert resting on a recess flat bottom face. Each insert has a flat bottom face, while the top face has a shallow generally spherical convex contour. Each side face is generally concave and forms an arcuate cutting edge with the convex top face. The concave side face forms an angle with the top face of the insert and the magnitude of this acute angle and the degree of inclination of the recess flat bottom face are such as to provide a positive rake angle of 1°–30°, preferably 5°–25°, between the rake face of the insert and the work cut.

The tool face is preferably arcuate, typically forming an arc of at least 45° and usually at least 90°. For a typical half-round broach, the arc will be in excess of 180° and it may even form a full cylindrical broach.

The angle of the inserts with respect to the longitudinal inal axis of the tool body will normally be less than 20°. An angle of about 10°–15° is particularly preferred.

The inserts themselves are preferably quite small, typically having an edge length of about 0.4 to 1.0 inch. The thickness of each insert is preferably in the range of about 0.15 to 0.4 inch.

The inserts are preferably arranged in rows transverse to the longitudinal axis of the tool body. These rows are preferably perpendicular to the longitudinal axis. The inserts of each row are staggered circumferentially with respect to the inserts of the next adjacent row whereby paths of successive cutting edges partially overlap. For the arcuate tool faces, the rows of inserts are preferably of increasing diameter in a rearward direction so as to produce a progressively larger hole as the broach is moved through the work piece or the work piece over the broach.

By setting the series of small inserts at a small angle with respect to the longitudinal axis of the tool body, the cutting edges of these inserts form small arcs of a much larger circle. This, combined with the overlapping of the successive cutting edges due to the staggered arrangement of inserts in successive rows, results in a smooth finished surface having no more than very shallow grooving which is easily removed by a finishing tool.

An important feature of the present invention is the shape of the indexable cutter inserts. As mentioned above, these are preferably of quite small dimensions and are used in large numbers. Each insert is of a generally square wafer configuration with a countersunk axial hole through which a screw passes to hold the insert in position in a tool face recess.

The side faces of each insert can assume a wide variety of profiles, with a simple concave arc of a circle being the most convenient. It is, however, immaterial whether the profile is in the form of flat or curved lines, provided the angle between the top face and an adjacent side face of an insert forms an acute angle which, together with the degree of inclination of an insert with respect to the longitudinal axis of a tool body provides a positive rake angle of 1°-30° between the rake face and the work cut.

Yet another important feature of the present invention is the manner in which it prevents the development of a built-up edge between the workpiece and the cutting edge of the cutter insert. This is a layer of material which clings to the tool surface during broaching of steel or aluminum. When such a built-up edge forms, it is forced through the workpiece by the cutter face and does the actual fracturing or cutting. The chip body shears away from this built-up edge and passes off above. As the built-up edge becomes larger and larger, it becomes more and more unstable until fragments thereof are torn off. This built-up edge is, therefore, continually varying in size and attacking the area of fracture or shear with a varying area which causes roughness. Furthermore, it causes the cutting edge to wear quickly and frequently to break, resulting in further workpiece damage.

The combination of the arcuate cutting edge of each insert together with the positive rake angle is, in accordance with this invention, successful in moving the shavings formed in a direction such that a built-up edge is prevented. Furthermore, by properly arranging the magnitude of the positive rake angle and the spacing of the inserts and also using inserts of small dimensions, the plowing action which takes place between the cutting edges of the inserts and the workpiece causes a lifting and shearing of shavings from the workpiece on each side of the insert. Because of the small dimensions of the inserts, the shavings forming on each side of each insert are very narrow and there is a smooth and uniform dispersal of these narrow shavings away from the cutting edge. In this manner there is at all times a direct contact between the sharp cutting edge and the workpiece, resulting in a smoother surface behind the cut, less wear on the cutter, less damage to the cutter and less load and damage to the entire assembly.

Certain preferred embodiments of the present invention will now be illustrated by the attached drawings in which.

Figure 1:
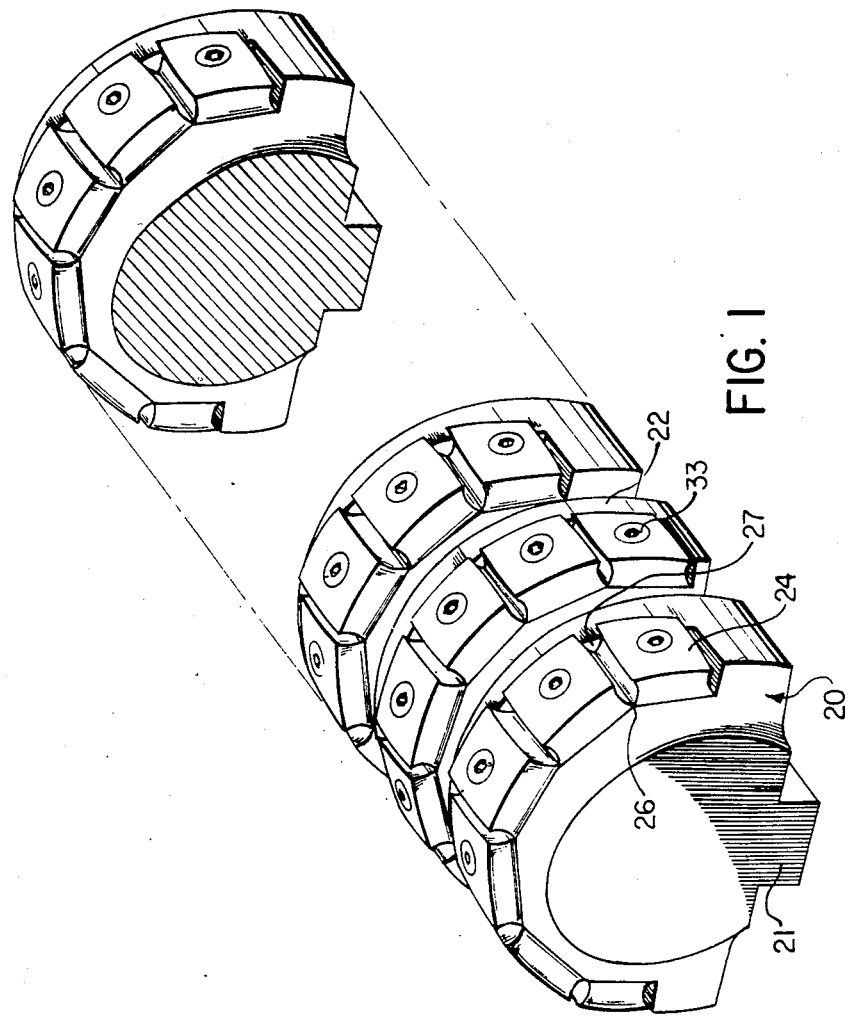
FIG. 1 is a perspective view of one embodiment of a novel broaching tool.

Looking now at the drawings, the device includes an elongated tool holder body portion 20 having a bottom spline 21 extending along the length thereof for retaining the tool in a tool holder (not shown).

A series of cutter inserts 24 are mounted in sockets in the cylindrical surface. These sockets are arranged in rows generally transverse to the longitudinal body axis with chip gullies 22 between the rows. Each of these sockets has a flat bottom face 26 which is inclined at a small angle of typically about 12° to 15° to the longitudinal axis of the body portion 20 and the socket also has an abutment wall 27 generally shaped to engage the corresponding side face of a cutter insert. Extending into the body portion 20 through face 26 is a tapped hole 32.

One preferred form of cutting insert is shown at 24 and this has concave side faces 29 and a top face 28 having a shallow generally spherical convex contour. The edge 39 formed between the convex top face 28 and the concave side face 29 is an arcuate cutting edge 39. A hole 31 is formed axially through the insert with a conical countersink 30. The cutting insert is typically made from tungsten carbide, although any other suitable material can be used. It is preferably held in position by means of a threaded screw 33 having a conical head portion which mates with the countersink of the cutting insert and the head of the screw includes a socket 34 for receiving a wrench. When the cutting insert has been placed in position in the socket 25 and the screw tightened, the insert is pressed firmly against the abutment wall 27. Thus, when the broach is in operation, the forces on the cutting inserts are fully carried by the abutment walls 27 rather than by the screws themselves.

Figure 2:
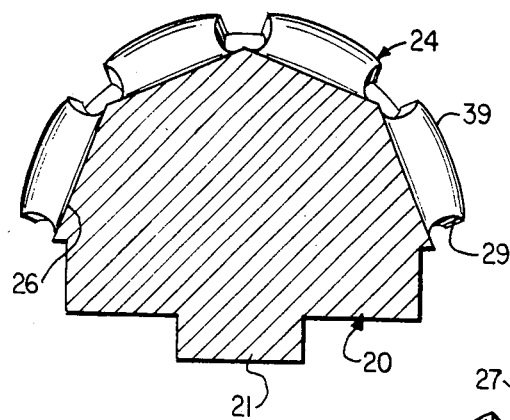
FIG. 2 is a cross section through row 1 of the tool of FIG. 1.
Figure 3:
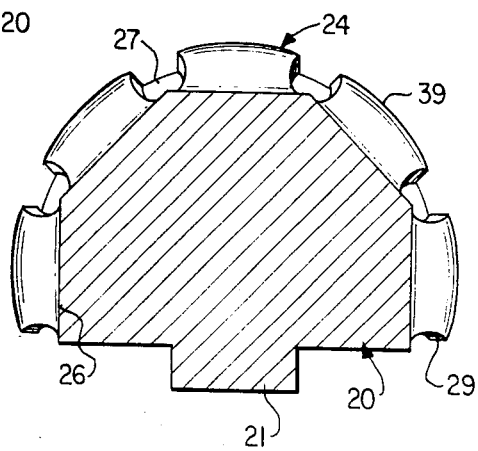
FIG. 3 is a cross section through row 2 of the tool of FIG. 1.

Particularly from FIGS. 2 and 3, it becomes evident that the successive rows of cutting inserts are positioned in a circumferentially staggered manner. Thus, the axis of the cutting inserts of row 2 are positioned midway between the axis of the inserts of row 1 while the inserts of row 3 are in alignment with the inserts of row 1. The diameter typically is increased by an amount of about 0.004 inch from one row to the next following row. However, it is also possible to have two or more adjacent rows of the same diameter followed by two or more rows of increased equal diameter. It is also sometimes desirable to have the last cutting insert of one row at the same elevation as the first cutting insert of the next following row.

Figure 4:
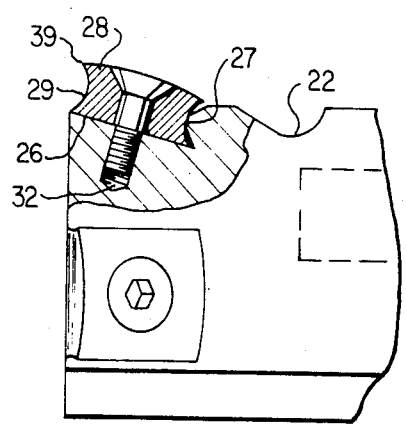
FIG. 4 is a detailed elevation in partial section showing a mounted insert.
Figure 5:
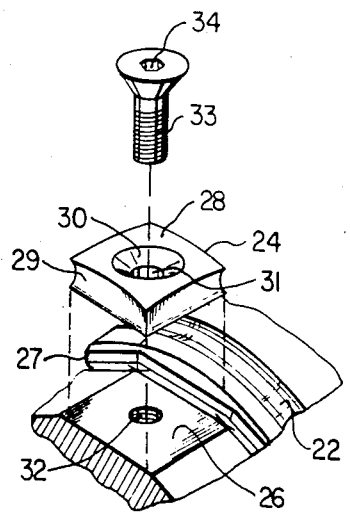
FIG. 5 is an exploded detail view of a cutting insert and socket.

Looking now at FIG. 4, the bevelled top face 28 of cutter insert 24 provides a clearance angle with respect to the work cut of about 1°-3° at the cutting edge. Because the cutter inserts of this invention are of a relatively small dimension, the effect of the positive rake angle is not simply that of lifting the chip away from the work cut but because the rake face is both inclined upwardly away from the cutting edge and at the same time is circular in cross section, the chip tends to lift and at the same time fracture or shear as in a plowing action. This is highly effective in preventing the build up of a compressed mass between the cutting edge and the work piece so that a smooth clean cut is formed.

Figure 6:
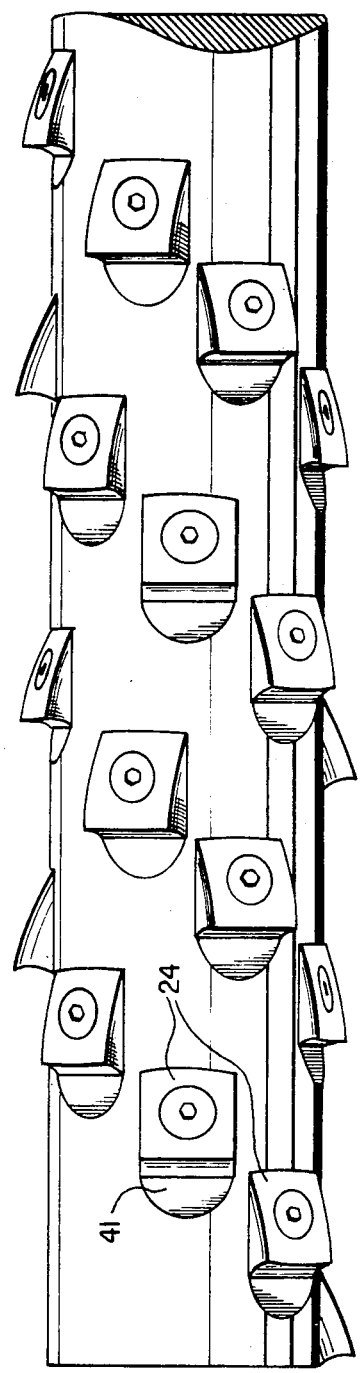
FIG. 6 is a top plan view of a further embodiment of the invention.

FIG. 6 shows an alternative embodiment in which the cutter inserts are mounted in recesses 41 arranged in helical or generally circumferentially and axially advancing paths about the tool body arcuate face to form a series of spaced helical rows. The helical path normally defines an angle of about 5° to 95° with respect to the longitudinal axis of the body and a typical tool has a helical angle in the order of about 15° to 45°.

I claim:

1. A metal cutting tool assembly comprising: an elongated tool body having an elongated tool face portion, a plurality of recesses formed in said tool face, each said recess having a flat bottom face inclined inwardly and rearwardly to the longitudinal axis of the tool body; and a plurality of substantially square, thin cutter inserts mounted in said recesses, each said cutter insert having a generally flat, square bottom face adapted to rest on the flat bottom face of one od said recesses with a first edge of the bottom face of said insert disposed perpendicularly to the longitudinal axis of said tool body, a top face having a shallow generally spherical convex contour and four side faces each having a generally concave contour, the lines of intersection between said concave side faces and said generally spherical convex top face of each insert forming arcuate cutting edges, said cutting edges having shallow arcs which lie substantially in planes disposed perpendicularly to the bottom face of said insert and extending through the edges of said bottom face of said insert and said concave side faces forming acute angles with the top face, the magnitude of said acute angle and the degree of inclination of said flat bottom face of said recess being selected to provide a positive rake angle of 1°-30° between the cutter portion and the workpiece, the magnitude of the positive rake angle and the spacing of the cutter inserts providing a plowing action between the cutting edges of the inserts and the workpiece with narrow shavings lifting and shearing from the workpiece, thereby providing a smooth and uniform dispersal of narrow shavings away from the cutting edges.

2. A metal cutting tool assembly according to claim 1 wherein each cutter insert has lateral dimensions of about 0.4 to 1.0 inch square.

3. A metal cutting tool assembly according to claim 2 wherein each cutter insert has a thickness of 0.15 to 0.4 inch.

4. A metal cutting assembly according to claim 3 wherein the positive rake nagle is in the range of 5°-25°.

5. A metal cutting tool assembly according to claim 3 wherein said cutter inserts are mounted in said recesses formed in a substantially cylindrical tool body face.

6. A metal cutting tool assembly according to claim 4 wherein said cutter inserts are arranged in a half-round broaching configuration.

7. A metal cutting tool assembly according to claim 4 wherein the cutter inserts are mounted in spaced rows with the inserts of each row being staggered circumferentially with respect to the inserts of the next adjacent row whereby the paths of successive inserts partially overlap.

8. A metal cutting tool assembly according to claim 7 wherein the spaced rows are of increasing diameter along the length of the tool.

9. A metal cutting tool assembly according to claim 8 wherein at least two adjacent rows are of equal diameter, followed by at least two adjacent rows of increased, equal diameter.

10. A metal cutting tool assembly according to claim 7 wherein the rows of inserts are perpendicular to the longitudinal axis of the tool body.

11. A metal cutting tool assembly according to claim 1 wherein the recesses and cutter inserts are arranged in a helical path.

12. A metal cutting tool assembly according to claim 11 wherein the helical path defines an angle of about 5° to 95° with respect to the longitudinal axis of the tool body.

13. A cutter insert for a metal cutting tool assembly, said cutter having a generally flat, square bottom face, a top face having a shallow generally spherical convex contour and four side faces each having a generally concave contour, the lines of intersection between said concave side faces and said spherical convex top face forming arcuate cutting edges, said cutting edges having shallow arcs which lie substantially in planes disposed perpendicularly to the bottom face and extending through the edges of the bottom face and said concave side faces forming acute angles with said top face.

14. A cutter insert according to claim 13 having lateral dimensions of about 0.4 to 1.0 inch square.

15. A cutter insert according to claim 14 having a thickness of 0.15 to 0.4 inch.

16. A cutter insert according to claim 15 having a hole extending centrally, axially therethrough to receive a mounting screw.

17. A metal cutting tool holder comprising: an elongated tool body having an elongated tool face portion, a plurality of recesses formed in said tool face, each said recess having a flat bottom face inclined inwardly and rearwardly to the longitudinal axis of the tool body thereby providing a high front edge and low rear edge, a tapped hole extending into said bottom face and an abutment wall extending upwardly from said low rear edge, said abutment wall comprising a straight convex face perpendicular to the longitudinal axis of the tool body, each said recess being adapted to retain a substantially square, thin, cutter insert having a flat bottom face adapted to rest on said flat bottom face of said recess with a first edge of the bottom face of said insert disposed perpendicularly to the longitudinal axis of said tool body, each said cutter insert having a generally flat, square bottom face, a top face having a shallow generally spherical convex contour and four side faces each having a generally concave contour, the lines of intersection between said concave side faces and said spherical convex top face forming arcuate cutting edges, said cutting edges having shallow arcs which lie substantially in planes disposed perpendicularly to the bottom face of said insert and extending through the edges of the bottom face of said inert and said concave side faces forming acute angles with said top face 18. A tool holder according to claim 17 wherein the flat bottom faces of adjacent recesses adjoin.

19. A tool holder according to claim 18 wherein the recesses are formed in spaced rows with the recesses of each row being staggered circumferentially with respect to the recesses of the next adjacent row.

20. A tool holder according to claim 19 wherein the rows of recesses are perpendicular to the longitudinal axis of the tool body.

21. A tool holder according to claim 19 wherein the rows of recesses are arranged in a helical path.

* * * * *

UNITED STATES PATENT AND TRADEMARK OFFICE
CERTIFICATE OF CORRECTION

PATENT NO. : 4,569,619
DATED : February 11, 1986
INVENTOR(S) : Douglas Newton

It is certified that error appears in the above-identified patent and that said Letters Patent is hereby corrected as shown below:

Column 5, line 9, "od" should be --of--.

Column 6, line 50, "inert" should be --insert--.

Signed and Sealed this

Eighth Day of July 1986

[SEAL]

Attest:

DONALD J. QUIGG

Attesting Officer

Commissioner of Patents and Trademarks